United States Patent [19]

Hudson et al.

[11] 3,899,279

[45] Aug. 12, 1975

[54] BLOW MOLDING APPARATUS

[75] Inventors: Jimmie E. Hudson; Jimmie L. Dean, both of Bartlesville, Okla.

[73] Assignee: Phillips Petroleum Company, Bartlesville, Okla.

[22] Filed: Aug. 15, 1974

[21] Appl. No.: 497,621

[52] U.S. Cl..... 425/387 B; 425/408; 425/DIG. 203; 425/DIG. 206; 425/DIG. 211; 425/DIG. 214; 425/DIG. 233; 264/94
[51] Int. Cl. .......................... B29c 1/00; B29c 17/07
[58] Field of Search....... 425/DIG. 208, 242 B, 130, 425/387 B, 302 B, 305 B, 324 B, 326 B, 340, 395, DIG. 206, DIG. 210, DIG. 211, DIG. 203, DIG. 216; 264/94, 98

[56] References Cited
UNITED STATES PATENTS 3,325,860 6/1967 Hansen ................................ 264/98
3,806,587 4/1974 Turner ........................... 425/387 B

*Primary Examiner*—Francis S. Husar
*Assistant Examiner*—R. J. Charvat

[57] ABSTRACT

A blow mold having neck-forming jaws with two spaced apart choke rings to restrict movement of material from the neck area of a container during neck forming and orientation of the container. The jaws also have a groove in surfaces defining the neck-forming bore to form a seal collar on the container with the groove being positioned between the choke rings wherein the collar is formed preferably by blowing with one of the choke rings restricting movement of container material from said collar during blowing and orientation of said container. The other choke ring restricts flow of material from the neck area of the container during molding of same.

8 Claims, 3 Drawing Figures

BLOW MOLDING APPARATUS

During molding of either oriented or non-oriented containers from synthetic resins such as polypropylene and polyvinyl chloride, by a blow molding process, certain areas of the neck section of the container have a tendency to thin out. Generally, the neck areas of such containers are required to be held to close tolerances dimensionally. One method of forming the neck area of a container is by compression-molding to form threads thereon while maintaining the close dimensional tolerances. It is also desirable in certain containers to form a seal collar either by blowing or compression-molding same at a position between the threads and the body of the container. This has presented some difficulty in the past in that during biaxial orientation of the container, material moves from the neck into the shoulder area due to stretching of the parison. It is highly desirable to ensure reliable neck and thread formation in blow molded containers and still maintain close dimensional tolerances in the container.

The principal objects of the present invention are: to provide a blow mold with a plurality of choke rings to ensure more reliable neck and thread formation in blow molded containers; to provide such a blow mold with means to form a seal collar between the threads on the neck area and the body of the molded container; to provide such a blow mold wherein one of the choke rings is positioned between the seal collar-forming groove in neck forming jaws of the blow mold and the cavity of the blow mold in which the body portion of the container is formed, wherein the second choke ring restricts movement of the container material from the neck area and seal collar area of the container into the shoulder and body portion of the container; to provide such a blow mold wherein the neck area of the container is adapted to be formed by compression-molding with the other of the choke rings restricting movement of material from the neck area of the container into the seal collar area of the container; to provide such a blow mold with choke rings having a generally triangularly shaped cross section so as to reduce notch sensitivity or strength in the choke ring areas of the neck and therby improve the quality of the containers formed in the blow mold; and to provide such a blow mold which is well adapted for its intended use and positive in operation.

Other objects and advantages of the present invention will become apparent from the following description taken in connection with the accompanying drawings wherein are set forth by way of illustration and example certain embodiments of the present invention.

Figure 1:
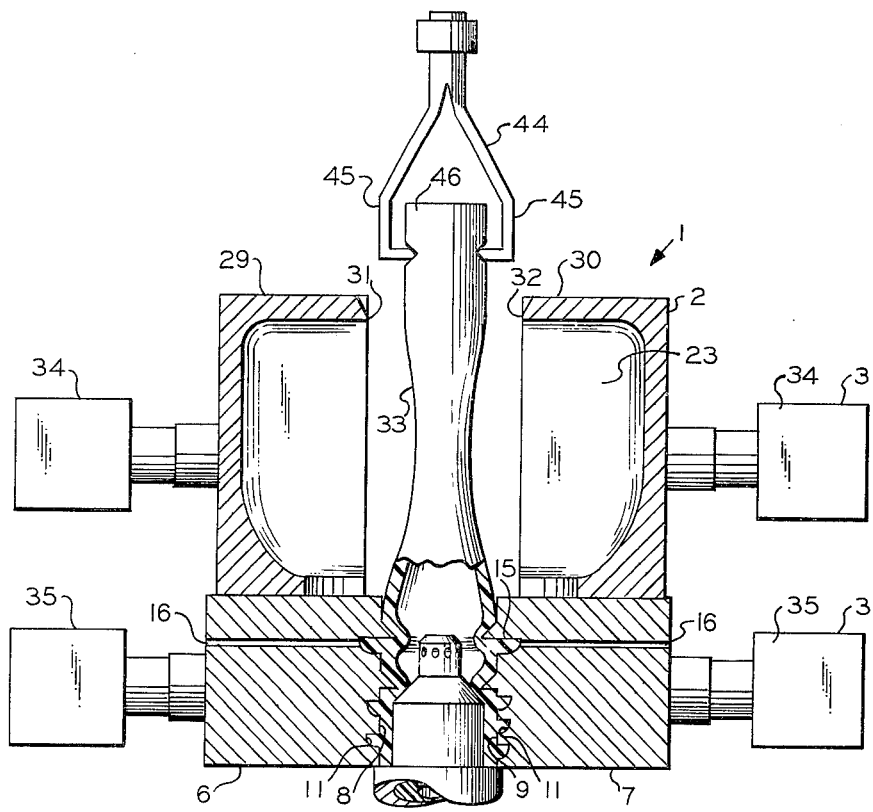
FIG. 1 is a side-elevation view of a blow mold comprising the present invention showing same in environment with portions of a blow molding machine shown symbolically.
Figure 2:
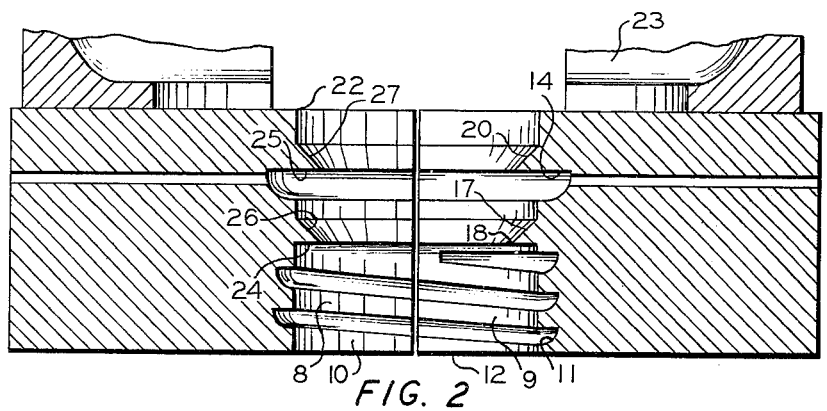
FIG. 2 is an enlarged fragmentary section view of a neck forming jaw portion of the blow mold showing same with a parison therein forming a neck portion of a container.
Figure 3:
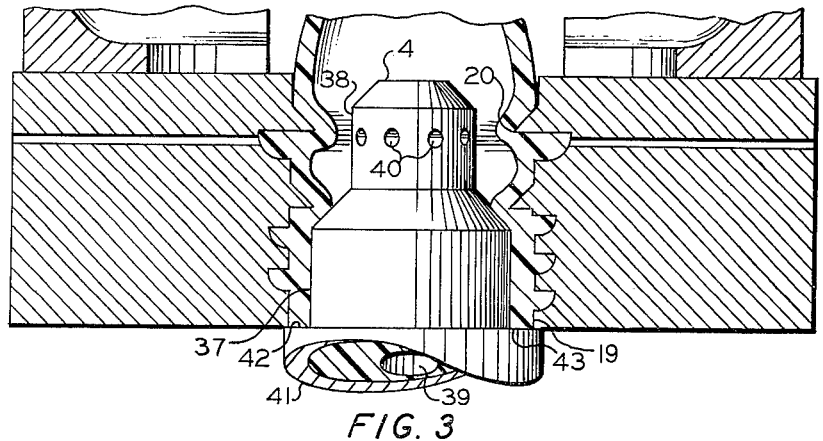
FIG. 3 is an enlarged fragmentary sectional view similar to FIG. 2 without a parison positioned between the jaw portions.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

The reference numeral 1 designates generally a blow molding apparatus utilized for the manufacture of blow molded containers, preferably biaxially oriented, which are manufactured from a synthetic resin such as polypropylene, polyvinyl chloride and the like. The molding apparatus in the form shown includes a mold 2 with means 3 operably connected to portions thereof to effect opening and closing movement of the mold. A blow pin assembly 4 is positioned adjacent to the mold 2 and has means (not shown) connected thereto to effect axial movement of same into and out of a neck forming portion of the mold 2. The apparatus 1 as illustrated is of a bottom blow type wherein the container is blown in an inverted position but it is to be understood that the apparatus 1 can also be of a type to manufacture containers in other positions such as a top blow.

The mold 2 in the illustrated structure includes neck-forming jaw portions 6 and 7 having respective surfaces 8 and 9 which define an opening or bore 10 through the jaws 6 and 7 when same are in a closed position. The bore 10 forms the exterior of the neck of a container during the blow molding process. The surfaces 8 and 9 are provided with a thread-forming groove 11 extending inwardly from the surfaces with the groove 11 being spiral and coextensive when the jaws 6 and 7 are in the closed position. The groove 11 is positioned adjacent a free end 12 of the bore 10. A groove 14 is also provided in the surfaces 8 and 9 with same being coextensive when the jaws 6 and 7 are closed wherein the groove 14 forms an annular collar 15 on the container neck with the collar 15 being adapted to form a seal with a cap (not shown) used to close the container. Vent holes 16 communicate between the groove 14 and the exterior of the jaws 6 and 7 to prevent the entrapment of air or other gases within the groove 14 during the molding process.

Means are provided for preventing or restricting movement of container forming material from the neck area during the molding process. As shown, the means includes a first rib 17 extending outwardly from each of the surfaces 8 and 9 into the bore 10 and preferably positioned between the thread-forming groove 11 and the collar-forming groove 14 with a free edge 18 thereof positioned adjacent the blow pin 4 so as to form a restriction or choke to limit or prevent the movement of material from the threaded area of the neck 19 of the container. The ribs 17 are coextensive when the jaws are in the closed position and form an annular choke ring. A second rib 20 extends outwardly from the surfaces 8 and 9 into the bore 10 and preferably is positioned between the groove 14 and an end 22 of the bore 10 which is positioned adjacent to a cavity 23 which forms the body portion of the container during blow molding. The ribs 20 are coextensive when the jaws are in the closed position and form an annular choke ring. Preferably, the ribs 17 and 20 each have a generally triangularly cross section having surfaces 24 and 25, respectively, which are generally normal to the longitudinal axis of the bore 10 and face the free end 12. Surfaces 26 and 27 extend from the respective surfaces 8 and 9 into the bore and are inclined from said surfaces toward the end 12 to the respective surfaces 24 and 25 forming a juncture or edge therebetween. The edges at the juncture of the surfaces 24 and 26, and 25 and 27 are relieved or broken to reduce notch sensitivity in the neck of the container at the groove areas formed by the ribs 17 and 20. Such a configuration of ribs provides a flat shoulder on the surfaces 24 and 25 to limit or prevent movement of material from the neck area and still provide minimal contact with the material and thereby reducing notch sensitivity of the neck area.

The mold 2 includes mold halves 29 and 30 having the cavity 23 therein and positioned adjacent to the end 22. Preferably, and as shown, the mold halves 29 and 30 are separate from the jaws 6 and 7 and are movable independently thereof. It is to be noted, though, that the jaws 6 and 7, and the respective mold half 29 or 30, can be of one piece construction in the practice of the invention. The mold halves 29 and 30 are provided with pinch-off edges 31 and 32, respectively, which when the mold halves 29 and 30 move to their closed position, the edges 31 and 32 pinch the parison 33 to trim the length thereof and seal the pinched end.

Means are provided for effecting opening and closing movement of the mold halves 29 and 30 and jaws 6 and 7 with the means 3 including, in the illustrated structure, extendable rams 34 operably connected to each of the mold halves 29 and 30 to effect their opening and closing movement independently of the jaws 6 and 7. The means further include extendable rams 35 operably connected to each of the jaws 6 and 7 to also effect their opening and closing movement. The rams 34 and 35 are of generally standard construction such as air cylinders.

The blow pin 4 can be of any suitable structure preferably having an enlarged diameter portion 37 which when inserted into the parison 13 compression-molds the material in the neck area to form threads in the groove 11. The blow pin 4 also has a lead-in area 38 having a smaller diameter than the enlarged portion 37 to facilitate entry of same into the interior of the parison 33. The blow pin preferably has antistick qualities on the exterior surface thereof and can be made of a material such as teflon. A bore 39 extends axially through the blow pin 4 so as to provide a conduit for blow air to pass therethrough and into the parison 33 with the blow pin 4 preferably being provided with a plurality of circumferentially spaced openings 40 communicating with the bore 39. The openings 40 assure the introduction of blow air into the collar area of the neck to ensure blow molding of same. The blow pin 4 preferably is provided with a shoulder-forming member 41 with a shoulder 42 which forms the end 43 of the neck area of the container to reduce secondary post molding operations on the container. Preferably, the shoulder member 41 is of a durable and hard material such as tool steel.

The present invention is more fully understood by a description of the operation thereof. The parison 33 is suitably moved into position within the mold 2 with the neck end thereof being received over the small portion 38 of the blow pin 4. Such movement can be accomplished by a transfer mechanism 44 which is operable to remove a preheated parison from an oven (not shown) by gripping same between a pair of jaw portions 45 adjacent an upper end 46 of the parison. The transfer mechanism 44 moves the parison between the mold halves 29 and 30 and jaws 6 and 7 and after the blow pin 4 is received within the interior of the parison the jaws 6 and 7 move to a closed position about the parison. The blow pin 4 moves axially upwardly with the enlarged portion 37 entering the parison and forming portions of the neck area by compression-molding. When the blow pin 4 is advanced axially upward the additional distance into said parison, it forms the thread portion of the neck area. During the upward axial movement of the blow pin 4, the ribs 17 help prevent the blow pin 4 from pushing material out of the thread area of the neck. Optionally, the blow pin 4 can be stationary and the neck of the parison can be compression-molded as jaws close squeezing the parison between jaws and blow pin. After the jaws 6 and 7 have closed, the transfer mechanism 44 stretches the parison 33 axially to effect orientation thereof if biaxial orientation is desired for the particular container being molded. After stretching of the parison 33, the mold halves 29 and 30 move from their open position, as seen in FIG. 1, to a closed position by extension of the rams 34 wherein the edges 31 and 32 pinch the parison 33 to close and seal the end thereof after which blow air is introduced into the pinched parison to blow mold same into the cavity 23 thus effecting biaxial orientation of the body and forming collar area 15 of the neck. Introduction of the blow air finishes forming the neck area particularly by blow molding the area between the rib 17 and end 22. During compression-molding of the threads in the groove 11, the annular choke ring formed by the ribs 17 restrict movement of material from the neck area between the ribs 17 and the end 12 to assure good quality threads on the neck area. During stretching and blowing of the parison 33 for the preferred biaxial orientation, material between the ribs 17 and the end 22 would have a tendency to move into a shoulder area of the container except that the annular choke ring formed by the rib 20 prevents the material from moving into the shoulder area from the collar 15 and other portions of the neck area to assure a consistent quality collar 15. After blow molding of the container, the rams 34 and 35 are retracted and move the mold halves 29 and 30 and the jaws 6 and 7 to their open positions to release the container therefrom.

It is to be understood that while we have illustrated and described certain forms of our invention, it is not to be limited to the specific form or arrangement of parts herein described and shown except to the extent that such limitations are found in the claims.

What we claim and desire to secure by letters patent is:

1. A blow mold for forming a container having a neck, said blow mold comprising:
   a. means forming a mold portion having a container forming cavity therein with the mold having portions thereof relatively movable between mold open and closed positions;
   b. surfaces defining a bore for forming a container neck forming portion of said mold, said bore opening into the cavity of said mold and having a free first end and a second end adjacent said cavity;
   c. thread forming grooves in said surfaces for forming threads on one end of a container formed in said mold;
   d. a collar forming groove in said surfaces and positioned between said thread forming grooves and said second end for forming a collar on said container neck;

e. a first rib extending outwardly from each of said surfaces into said bore and positioned between said collar forming groove and said thread forming grooves and forming a flow restriction therebetween; and f. a second rib extending outwardly from each of said surfaces into said bore and positioned between said collar forming groove and said second end for restricting movement of container material away from said collar forming groove.

2. The mold as set forth in claim 1 wherein said means includes:

a. two separable mold halves relatively movable between said open and closed positions, said mold halves having portions defining said cavity; and b. jaw portions each cooperating with a respective said mold half and having a said surface thereon, said jaw portions being movable between first and second positions wherein when in said first position said surfaces define said bore.

3. The mold as set forth in claim 2 wherein:

a. said jaw portions being movable independently of said mold halves.

4. The mold as set forth in claim 2 wherein:

a. said first and second ribs having a generally triangular cross section with a first surface partially defining same being generally normal to a longitudinal axis of said bore and facing said first end.

5. The mold as set forth in claim 4 wherein:

a. said first and second ribs having a second surface partially defining extending into said bore from said surfaces and inclined from said surfaces toward said first end to said first surface and having a juncture with a respective said first surface, said juncture being characterized by the absence of a sharp edge.

6. A blow molding apparatus for forming a container having a neck, said apparatus comprising:

a. first and second mold halves positioned in opposed relation and movable between mold open and closed positions;

b. means operably connected to a respective said mold half for selectively moving same between said mold open and closed positions;

c. neck-forming jaws each positioned adjacent a respective said mold half and movable independently thereof between first and second positions, said jaws being in opposed relation and each having a neck-forming surface wherein when said jaws are in said first position said surfaces are coextensive and define an opening through said jaws, said opening having a free first end and a second end adjacent said mold halves, said jaws having thread-forming grooves in said surfaces for forming threads on a neck portion of a container formed in said mold halves and jaws;

d. second means operably connected to said jaws for selectively moving same between said first and second positions;

e. a collar-forming groove in each of said surfaces and positioned between said thread-forming grooves and said second end, said seal collar-forming grooves being coextensive when said jaws are in their said first position;

f. a first rib extending outwardly from each of said surfaces into said opening and being coextensive when said jaws are in their said first position to form a first annular choke ring positioned between said thread-forming grooves and said collar-forming grooves; and g. a second rib extending outwardly from each of said surfaces into said opening and being coextensive when said jaws are in their said first position to form a second annular choke ring positioned between said collar-forming grooves and said second end, said second ribs restricting flow of material, from which the container is formed, from the neck of said container into a body portion of said container.

7. The blow molding apparatus as set forth in claim 6 wherein:

a. said first and second ribs have a generally triangular cross section with a first surface partially defining same being generally normal to a longitudinal axis of said opening and facing said first end.

8. The blow molding apparatus as set forth in claim 7 including:

a. means for stretching and orienting a parison from which said container is formed wherein said second annular choke ring restricts flow of material from said container neck area into the container body portion during stretching and blowing of said parison.

* * * * *